United States Patent
Cha et al.

(10) Patent No.: US 8,346,283 B2
(45) Date of Patent: Jan. 1, 2013

(54) METHOD FOR LOCATION DETERMINATING

(75) Inventors: Jae-Sun Cha, Daejeon (KR);
Kwang-Jae Lim, Daejeon (KR);
Chul-Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 425 days.

(21) Appl. No.: 12/522,499

(22) PCT Filed: Jan. 8, 2008

(86) PCT No.: PCT/KR2008/000112
§ 371 (c)(1),
(2), (4) Date: Jul. 8, 2009

(87) PCT Pub. No.: WO2008/084967
PCT Pub. Date: Jul. 17, 2008

(65) Prior Publication Data
US 2009/0325605 A1  Dec. 31, 2009

(30) Foreign Application Priority Data
Jan. 8, 2007 (KR) .................. 10-2007-0002018

(51) Int. Cl.
*H04W 24/00* (2009.01)
(52) U.S. Cl. ................... 455/456.2; 455/456.1
(58) Field of Classification Search ............... 455/456.1, 455/456.2, 456.5, 404.2, 435.1, 436, 437, 455/438, 456.3; 370/328, 329, 330, 331; 340/539.13
See application file for complete search history.

(56) References Cited

U.S. PATENT DOCUMENTS 5,689,502 A  11/1997  Scott
6,252,543 B1  6/2001  Camp
(Continued)

FOREIGN PATENT DOCUMENTS

JP  63-235877  9/1988
(Continued)

OTHER PUBLICATIONS

Stuart Golden and Joey Chou, IEEE 802.16 Broadband Wireless Access Working Group: Location Measurement Enhancement for meeting E911 Phase II Accuracy Requirements. 2006. IEEE C802.16g-06/061.*

(Continued)

*Primary Examiner* — Kent Chang
*Assistant Examiner* — Nelson Rosario
(74) *Attorney, Agent, or Firm* — Staas & Halsey LLP

(57) ABSTRACT

A method for measuring a position includes: allocating a first ranging code and a first ranging region for a mobile station; receiving a second ranging code and allocation information on a second ranging region of the mobile station from a neighboring base station; transmitting the first ranging code and the second ranging code to the mobile station; receiving the first ranging code from the mobile station in the first ranging region; calculating a received timing adjustment value of the first ranging code; receiving a received timing adjustment value of the second ranging code from the neighboring base station; and measuring the position of the mobile station according to the received timing adjustment value of the first ranging code and the received timing adjustment value of the second ranging code. Therefore, the cost and efficiency can be improved by measuring the position of the mobile station by changing the ranging method used in the conventional system.

10 Claims, 2 Drawing Sheets

U.S. PATENT DOCUMENTS

| | | | |
|---|---|---|---|
| 6,473,694 B1 | 10/2002 | Akopian et al. | |
| 7,848,766 B2 | 12/2010 | Ogino et al. | |
| 2008/0014960 A1* | 1/2008 | Chou | 455/456.1 |

FOREIGN PATENT DOCUMENTS

| | | |
|---|---|---|
| JP | 7-181242 | 7/1995 |
| JP | 2001-112047 | 4/2001 |
| JP | 2001-524268 | 11/2001 |
| JP | 2007-43587 | 2/2007 |
| KR | 10-2006-0129886 | 12/2006 |
| KR | 10-2006-0132191 | 12/2006 |

OTHER PUBLICATIONS

Joey Chou et al., "Location Measurement Enhancements for meeting E911 Phase II Accuracy Requirements", IEEE 802.16 Broadband Wireless Access Working Group, Nov. 2006, pp. 1-10.

Jaesun Cha, et al. "Correction of U-TDOA Measurement Procedure." IEEE 802.16 Broadband Wireless Access Working Group, Jan. 4, 2007 (*published on* Jan. 16, 2007).

International Search Report for International Application No. PCT/KR2008/000112, mailed Apr. 28, 2008.

* cited by examiner

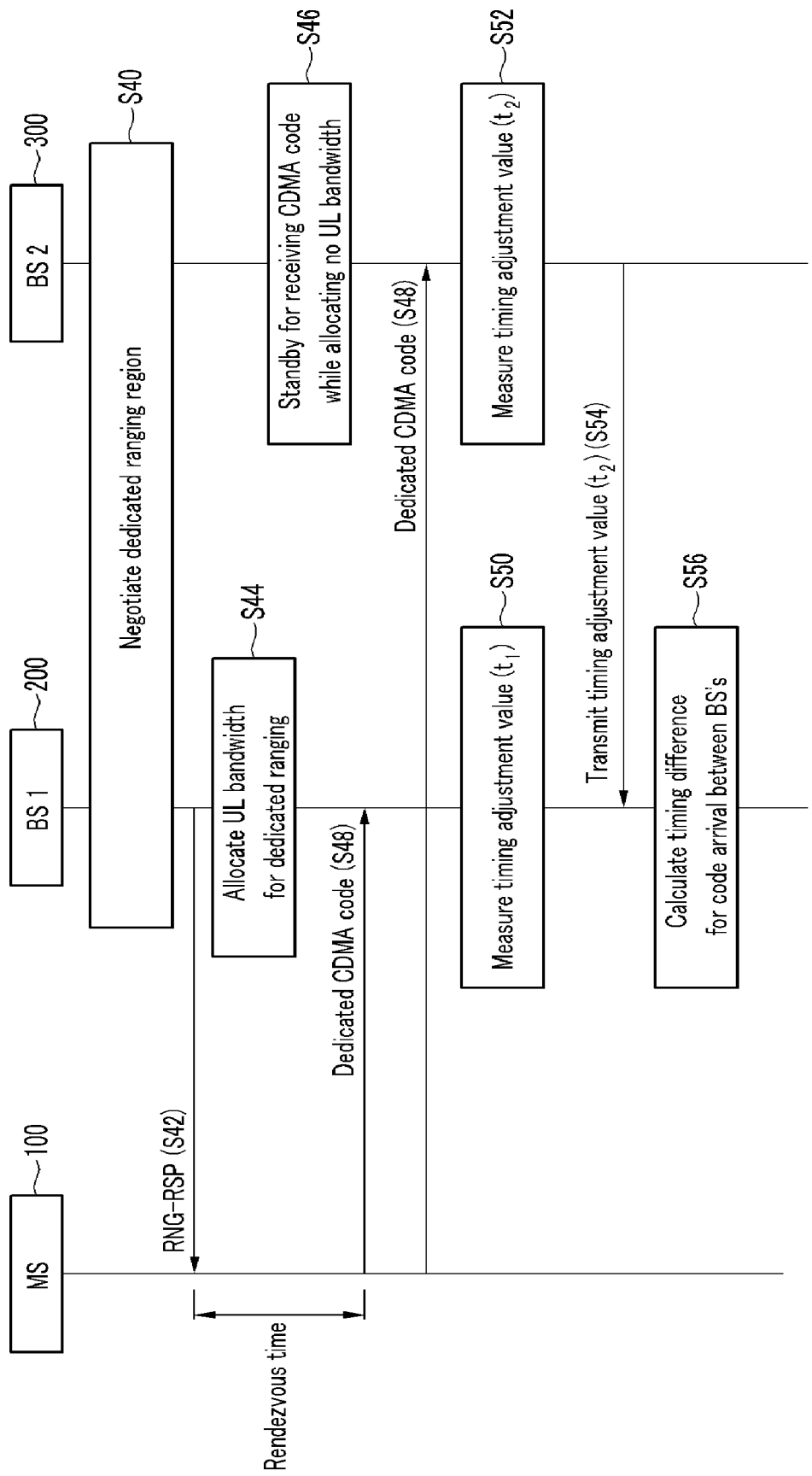

METHOD FOR LOCATION DETERMINATING

TECHNICAL FIELD

The present invention relates to a method for measuring a position of a mobile station in a wireless communication system. Particularly, the present invention relates to a method for measuring a position of a mobile station through dedicated ranging in a broadband wireless access system such as the IEEE (institute of Electrical and Electronics Engineers) 802.16.

This work was supported by the IT R&D program of MIC/IITA [2007-P10-03, Development of WiBro Evolution Standards].

BACKGROUND ART

A broadband wireless access system is a next generation communication system for supporting mobility for a local area data communication method using a fixed access point. Various standards have been proposed for the broadband wireless access system, and the IEEE 802.16 group have actively progressed international standardization of the broadband wireless access system.

The conventional wireless LAN (Local Area Network) method allows local area wireless communication with reference to the fixed access point, which however supports local area data communication through a wireless method and does not guarantee mobility of the mobile station.

The broadband wireless access method such as the IEEE 802.16 guarantees the mobility to provide a seamless data communication service when a mobile station moves from a cell covered by a base station to another cell covered by another base station.

The method for estimating the mobile station's position in the mobile communication system includes a method for attaching a position estimation device to the mobile station, a method for the mobile station to generate a predetermined signal, a method for the mobile station and the base station to use a separately allocated channel, and a method for using three angle positioning of the base station.

The method for attaching a position estimation device to the mobile station uses a global positioning system (GPS) and transmits information acquired through the GPS to the base station to estimate the position of the mobile station. The method for the mobile station to generate a predetermined signal is a method for the base station or a repeater to receive a predetermined signal from the mobile station and estimate the position. The method for the mobile station and the base station to use a separately allocated channel is a method for estimating the position by exchanging position information through a predetermined channel. The method for using the three angle positioning of the base station is a method for at least three base stations to measure a frequency radiated by a predetermined mobile station and estimate the position of the mobile station by using a three angle positioning scheme.

However, the above-noted position estimation methods of the mobile station are disadvantageous in terms of cost, efficiency, and utilization of frequencies because they attach an additional device to the mobile station or control the mobile station to perform additional functions. Also, it is difficult to use the three angle positioning method of the existing mobile communication when all the base stations use the same frequency.

It is possible to estimate the position of the mobile station by using the difference of signal arrival times between the mobile station and many base stations, and the difference of the signal arrival times is measured through a ranging process that is a basic function of the mobile station. However, the ranging method is a contention-based access method in which a collision occurs when a plurality of mobile stations simultaneously attempt the ranging process, and thereby it is difficult to measure the arrival time of the signal that is transmitted by the corresponding mobile station.

Further, the ranging process in the broadband radio access system such as the IEEE 802.16 is performed through the code division multiple access (CDMA) codes, and in this instance, it is difficult to identify the mobile station having transmitted the corresponding CDMA code since the CDMA code includes no user information, and hence it is difficult to measure the position of the mobile station.

DISCLOSURE

Technical Problem

The present invention has been made in an effort to provide a position measurement method for efficiently measuring the position of the mobile station in a broadband wireless access system by using the ranging function of the mobile station.

Technical Solution

In one aspect of the present invention, a method for measuring a position includes: allocating a first ranging code and a first ranging region for a mobile station; receiving a second ranging code and allocation information on a second ranging region of the mobile station from a neighboring base station; transmitting ranging information including the first ranging code and the second ranging code to the mobile station; receiving the first ranging code from the mobile station in the first ranging region; calculating a received timing adjustment value of the first ranging code; receiving a received timing adjustment value of the second ranging code from the neighboring base station; and measuring the position of the mobile station according to the received timing adjustment value of the first ranging code and the received timing adjustment value of the second ranging code.

The step of receiving the second ranging code and the allocation information on the second ranging region includes: transmitting a dedicated ranging allocation request on the mobile station to the neighboring base station; and receiving a response signal including the second ranging code and the information on the allocated ranging region on the mobile station.

The step of transmitting the ranging information including the first ranging code and the second ranging to the mobile station includes: transmitting a first ranging signal including a first ranging code, a first rendezvous time, and a first transmission opportunity offset; and transmitting a second ranging signal including a second ranging code, a second rendezvous time, and a second transmission opportunity offset after operating the received timing adjustment value of the first ranging code.

The method includes: receiving the first ranging code at the first transmission opportunity offset of the first frame after the first rendezvous time after having transmitted the first ranging signal; and receiving the second ranging code at the second transmission opportunity offset of the first frame after the second rendezvous time after having transmitted the second ranging signal.

The method includes correcting the second rendezvous time by using the time that is generated by subtracting a time for transmitting the second ranging signal from a time for receiving the second rendezvous time that is received from the neighboring base station, and then transmitting the corrected second rendezvous time.

In another aspect of the present invention, a method for measuring a position includes: negotiating a dedicated ranging code and a dedicated ranging region for a neighboring base station and a mobile station; transmitting a ranging signal including the dedicated ranging code to the mobile station; receiving the dedicated ranging code from the mobile station in the dedicated ranging region; operating a received timing adjustment value of the dedicated ranging code; receiving a received timing adjustment value of the dedicated ranging code from the neighboring base station; and measuring a position of the mobile station according to a received timing adjustment value of the dedicated ranging code.

The ranging signal includes the dedicated ranging code, rendezvous time, and transmission opportunity offset.

The ranging signal further includes a power level adjustment value.

In another aspect of the present invention, a method for measuring a position includes: allocating a first ranging code and a first ranging region for a mobile station; transmitting the first ranging code and information on the first ranging region to the mobile station; receiving the first ranging code from the mobile station in the first ranging region; and calculating a received timing adjustment value of the first ranging code.

The method includes: requesting second ranging code and second ranging region allocation for the mobile station from a neighboring base station; receiving a second ranging code and information on a second ranging region for the mobile station from the neighboring base station; transmitting the second ranging code to the mobile station; receiving a received timing adjustment value for receiving the second ranging code from the mobile station from the neighboring base station; and measuring a position of the mobile station according to a received timing adjustment value of the first ranging code and a received timing adjustment value of the second ranging code.

The Information on the first ranging region includes a first rendezvous time and a first transmission opportunity offset, and the information on the second ranging region includes a second rendezvous time and a second transmission opportunity offset.

Time information that is generated by subtracting a time for transmitting the second ranging code to the mobile station from the second rendezvous time that is received from the neighboring base station is transmitted as the second rendezvous time.

Advantageous Effects

According to the present invention, cost and efficiency are improved by measuring the position of the mobile station through changing the ranging method used in the conventional system.

DESCRIPTION OF DRAWINGS

FIG. 2 is a signal flowchart of a method for measuring a position of a mobile station to in a broadband wireless access system according to another exemplary embodiment of the present invention.

BEST MODE

Figure 1:
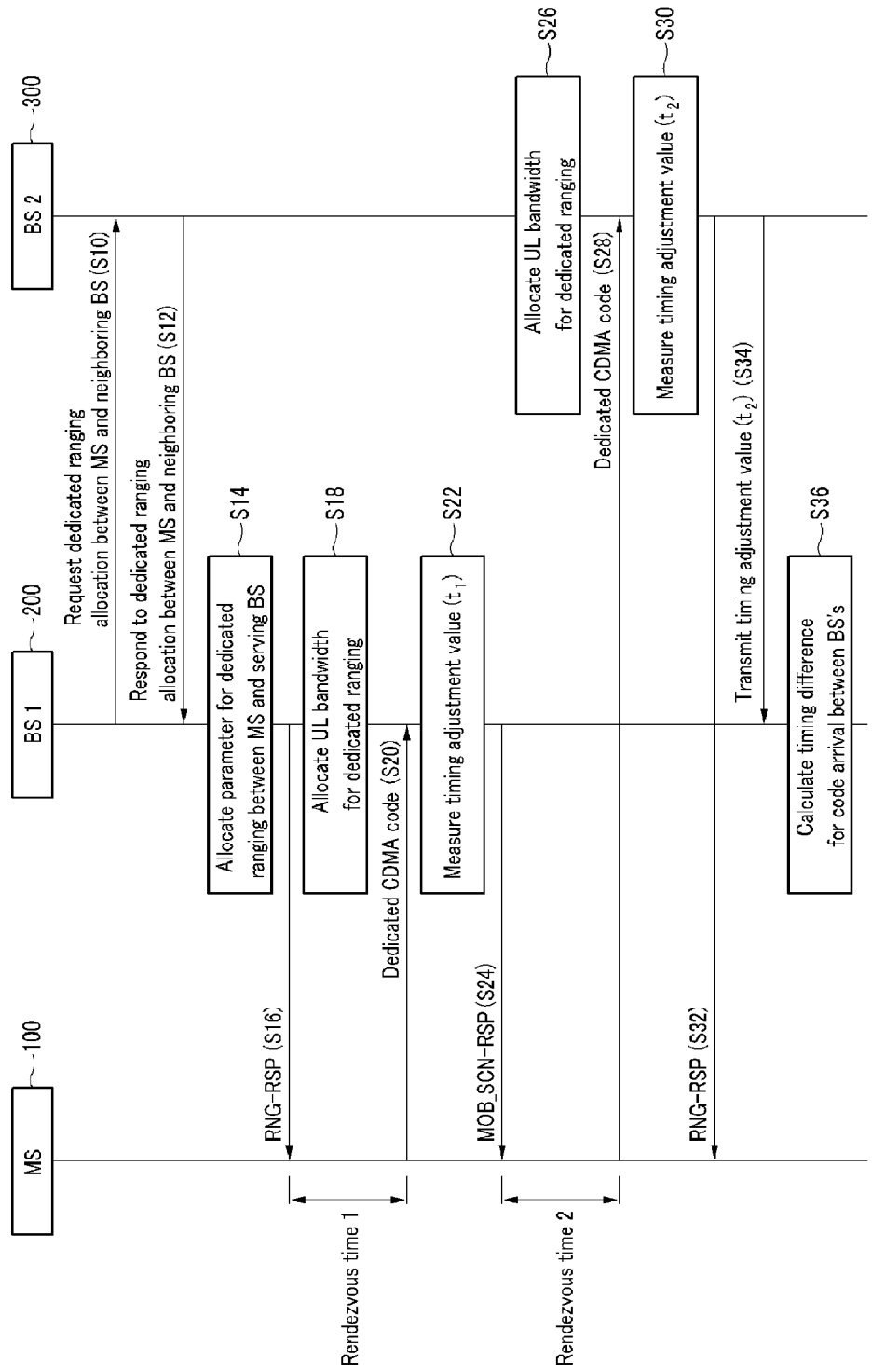
FIG. 1 is a signal flowchart of a method for measuring a position of a mobile station to in a broadband wireless access system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" and variations such as "comprises" will be understood to imply the inclusion of stated elements but not the exclusion of any other elements. Also, the terms of a unit, a device, and a module in the present specification represent a unit for processing a predetermined function or operation, which can be realized by hardware, software, or a combination of hardware and software.

In the specification, a mobile station (MS) may indicate a terminal, a mobile terminal (MT), a subscriber station (SS), a portable subscriber station (PSS), user equipment (UE), and an access terminal (AT), and may include the whole or partial functions of the mobile terminal, the subscriber station, the portable subscriber station, and the user equipment.

In the specification, the base station (BS) may represent an access point (AP), a radio access station (RAS), a nodeB (Node B), a base transceiver station (BTS), and a mobile multihop relay (MMR)-BS, and may include the whole or partial functions of the access point, the radio access station, the nodeB, the base transceiver station, and the mobile multihop relay-BS.

Referring to FIG. 1, a method for estimating the position of a mobile station according to an exemplary embodiment of the present invention will be described.

FIG. 1 is a signal flowchart of a method for measuring a position of a mobile station to in a broadband wireless access system according to an exemplary embodiment of the present invention.

The communication system includes a plurality of base stations 200 and 300, and a mobile station 100. Each base station 200 covers each cell. The cell may include a plurality of sectors, and each base station 200 communicates with the mobile station 100 within the cell.

Referring to FIG. 1, when the first base station 200 covering the cell in which the mobile station 100 is positioned determines that the positioned of the mobile station 100 is to be measured, the first base station 200 requests the neighboring second base station 300 to allocate a dedicated ranging region for the corresponding mobile station 100 (S10).

The dedicated ranging region that is requested from the second base station 300 by the first base station 200 is a ranging region that is used when the corresponding mobile station 100 performs ranging to the second base station 300, other mobile stations (not shown) that are registered to the second base station 300 and are then serviced cannot use the dedicated ranging region for the corresponding mobile station 100, and the corresponding mobile station 100 can only use it in a dedicated manner.

The second base station 300 having received a dedicated ranging region allocation request from the first base station 200 allocates a parameter needed for dedicated ranging, and transmits the parameter to the first base station 200 (S12).

In this instance, the second base station 300 only allocates the parameter needed for dedicated ranging region allocation, and the actual ranging region allocation is performed later, while the parameter that is allocated in this instance includes a rendezvous time, a CDMA code, and a transmission opportunity offset.

The first base station 200 allocates a parameter for dedicated ranging between the corresponding mobile station 100 and the first base station 200 (S14).

The parameter includes a rendezvous time, a CDMA code, and a transmission opportunity offset. In this instance, the parameter allocated by the first base station 200 is the same type as that of the second base station 300, but it may have a different value. The parameter allocated by the first base station 200 is used for dedicated ranging between the first base station 200 and the corresponding mobile station 100, and the parameter allocated by the second base station 300 is used for dedicated ranging between the second base station 300 and the corresponding mobile station 100.

The first base station 200 includes the allocated parameter as a type/length/value (TLV) format in a ranging response message (RNG-RSP) and transmits the same to the corresponding mobile station 100, and the ranging response message (RNG-RSP) in this case is expressed in Table 1 S16.

TABLE 1

| Syntax | | Size | Notes |
|---|---|---|---|
| RNG-RSP_Message_format<br>() {<br>Management message type = 5<br>Reserved<br>TLV encoded information { | | 8 bits<br>8 bits | |

| Name | Type | Length | Value |
|---|---|---|---|
| Rendezvous time | 36 | 1 byte | This is offset, measured in units of frame duration, when the BS is expected to provide non-contention-based ranging opportunity for the MS. The offset is calculated from the frame where an RNG-RSP message is transmitted. The BS is expected to provide a non-contention-based Ranging opportunity at the frame specified by Rendezvous time parameter. |
| CDMA code | 37 | 1 byte | A unique code assigned to the MS, to be used for dedicated ranging. Code is from the initial ranging code set. |
| Transmission opportunity offset | 38 | 1 byte | A unique transmission opportunity assigned to the MS, to be used for dedicated ranging in units of symbol duration. |
| Power Level Adjust | 2 | 1 byte | Tx Power offset adjustment (signed 8 bit, 0.25 dB unit) Specifies the relative change in transmission power level that MS is to make in order that transmissions arrive at the BS at the desired power. |
| }<br>} | | | |

As expressed in Table 1, the rendezvous time is an offset, includes a plurality of frames, and is computed from the frame from which the ranging response message (RNG-RSP) is transmitted. That is, the rendezvous time represents the frame through which the first base station 200 transmits the UL-MAP (UPLINK-MAP) having a defined dedicated ranging region.

The CDMA code is a code for identifying the mobile station 100, and is used for the dedicated ranging region that is allocated to the mobile station 100.

The transmission opportunity offset defines a proper transmission start point that is allocated to the corresponding mobile station 100 in a plurality of symbol regions. That is, the mobile station 100 transmits the CDMA code at the time that is defined by the transmission opportunity offset in the dedicated ranging region of the UL-MAP that is received in the first frame after the rendezvous time is passed.

The power level adjustment value defines a power level adjustment value for transmitting the CDMA code transmitted by the mobile station 100 to the first base station 200 or the second base station 300 with appropriate intensity, and may include the frequency reuse coefficient of 1.

The first and second base stations 200 and 300 define resource allocation information on the frame to the UL-MAP and transmit the same to the mobile station 100, and the UL-MAP includes allocation information of the ranging region for ranging. Also, the UL-MAP includes a dedicated ranging indicator, and defines the ranging region as a dedicated ranging region by enabling the dedicated ranging indicator when the first and second base stations 200 and 300 perform dedicated ranging.

The first base station 200 enables the dedicated ranging indicator and transmits the UL-MAP to the mobile station (S18) so that the mobile station 100 may perform the dedicated ranging process in the first frame after the rendezvous time is passed from the frame having transmitted the ranging response message (RNG-RSP) after having transmitted the ranging response message (RNG-RSP) 100.

When having received the ranging response message (RNG-RSP) from the first base station 200, the mobile station 100 receives the UL-MAP (Uplink MAP) from the first base station 200 at the first frame after the rendezvous time is passed from the frame at which the mobile station 100 received the ranging response message (RNG-RSP).

The mobile station 100 checks whether the dedicated ranging indicator is enabled from the UL-MAP, and determines the ranging region to be a dedicated ranging region of the UL-MAP when the dedicated ranging indicator is enabled.

Next, the mobile station 100 transmits the CDMA code included in the ranging response message (RNG-RSP) to the first base station 200 through the allocated resource that begins from the start point defined by the transmission opportunity offset of the ranging response message (RNG-RSP) in the dedicated ranging region S20.

The first base station 200 receives the CDMA code from the mobile station 100, and measures the timing adjustment value t1 for the arrival time of the CDMA code (S22).

The first base station 200 includes the dedicated ranging information that is received from the second base station 300 in a scanning response message (MOB_SCN-RSP) and transmits the same to the corresponding mobile station 100 (S24) for the purpose of dedicated ranging between the corresponding mobile station 100 and the second base station 300.

In this instance, the rendezvous time included in the scanning response message (MOB_SCN-RSP) is the time that is generated by subtracting the time for transmitting the scanning response message (MOB_SCN-RSP) from the rendezvous time that is received by the first base station 200 from the second base station 300, and the first base station 200 changes the rendezvous time and transmits the changed rendezvous time to the corresponding mobile station 100.

The second base station 300 defines the first frame, that is, after the rendezvous time is passed from the time when the second base station 300 has provided a dedicated ranging allocation response to the first base station 200, to be a frame for performing a dedicated ranging process with the corresponding mobile station 100, enables a dedicated ranging indicator to the corresponding frame, and transmits the UL-MAP.

Therefore, the ranging region to which the uplink bandwidth is allocated for performing the ranging process is defined to be a region for dedicated ranging (S26).

The corresponding mobile station 100 is synchronized with the second base station 300 at the first frame after the rendezvous time has passed from the frame at which the mobile station 100 received the scanning response message (MOB_SCN-RSP). The corresponding mobile station 100 receives the UL-MAP from the second base station 300 at the corresponding frame, and transmits the CDMA code included in the scanning response message (MOB_SCN-RSP) to the second base station 300 at the transmission opportunity offset that is received through the scanning response message (MOB_SCN-RSP) in the ranging region that is allocated to the corresponding frame when the dedicated ranging indicator of the UL-MAP is enabled (S28).

The second base station 300 measures the timing adjustment value t2 and received code quality at the code arrival time by using the received CDMA code (S30), includes a ranging correction result caused by the code received quality result into the ranging response message (RNG-RSP) and transmits the same to the mobile station 100 (S32). Also, the second base station 300 transmits the timing adjustment value t2 to the first base station 200 (S36).

The first base station 200 uses the timing adjustment values t1 and t2 to compute the uplink arrival time difference between the corresponding mobile station 100 and the base station and measure the position of the mobile station 100 S36.

In this instance, the first base station 200 can measure the time difference $T=(t1-t2)/2$ between the corresponding mobile station 100 and the base station from the timing adjustment values t1 and t2 by using the uplink-time difference of the arrival (U-TDOA) measurement method. Therefore, the first base station 200 measures the position of the corresponding mobile station 100 by using the product of the time difference T and light speed and calculating the distance difference between the respective base stations 200 and 300 and the corresponding mobile station 100.

In this instance, the dedicated ranging process (S24-S34) between the corresponding mobile station 100 and the second base station 300 can be performed in advance of the dedicated ranging process (S14-S22) between the first base station 200 and the corresponding mobile station 100. That is, when the rendezvous time received from the second base station 300 is very short and the dedicated ranging process (S14-S22) between the first base station 200 and the corresponding mobile station 100 cannot be performed before the rendezvous time, a dedicated ranging process (S24-S34) between the second base station 300 and the corresponding mobile station 100 can be performed in advance.

Further, the dedicated ranging allocation regions between the first base station 200 and the second base station 300 are not superimposed, and the first base station 200 can perform the dedicated ranging process (S24-S34) between the second base station 300 and the corresponding mobile station 100 while performing the dedicated ranging process (S14-S22) with the corresponding mobile station 100.

Also, the first base station 200 and the second base station 300 can allocate the same CDMA code or the same transmission opportunity offset to a plurality of mobile stations, and one of the CDMA code and the transmission opportunity offset must be different so as to prevent collision.

The dedicated ranging region and the dedicated CDMA code are assigned to the mobile station that requires position estimation by using the ranging as described above, and the position estimation is performed by receiving the dedicated CDMA code in the dedicated ranging region, thereby efficiently performing the position estimation.

Referring to FIG. 2, a method for estimating a position of a mobile station by using a ranging process when the frequency reuse coefficient is 1 will now be described.

FIG. 2 is a signal flowchart of a method for measuring a position of a mobile station in a broadband wireless access system according to another exemplary embodiment of the present invention.

When the frequency reuse coefficient is given as 1, the first base station 200 and the second base station 300 use the same frequency.

When the first base station 200 covering the cell in which the mobile station 100 is positioned determines to measure the position of the mobile station 100, the first base station 200 requests the adjacent second base station 300 to negotiate allocation of a dedicated ranging region for the corresponding mobile station 100.

The CDMA code transmitted by the mobile station 100 is transmitted with the same frequency to the first and second base stations 200 and 300, and hence, the first and second base stations 200 and 300 must simultaneously receive the CDMA code. For this purpose, when the mobile station 100 transmits the CDMA code, the first base station 200 must allocate an uplink bandwidth that is usable by the corresponding mobile station 100, and the second base station 300 must not allocate the same uplink bandwidth as that allocated by the first base station 200 to another mobile station (not shown).

The first base station 200 and the second base station 300 negotiate the time and a dedicated ranging region to be allocated before dedicated ranging (S40).

The first base station 200 includes dedicated ranging parameters that are determined through the negotiation with the second base station 300, that is, a rendezvous time, a CDMA code, a transmission opportunity offset, and a power level adjustment value in the ranging response message (RNG-RSP), and transmits the ranging response message to the corresponding mobile station 100 (S42).

After having transmitted the ranging response message (RNG-RSP), the first base station 200 transmits the UL-MAP having a frame to which a dedicated ranging region is allocated (i.e., dedicated ranging indicator is enabled) to the corresponding mobile station 100 at the first frame after the rendezvous time is passed starting from the frame at which the ranging response message (RNG-RSP) is transmitted (S44).

The second base station 300 does not allocate the same uplink bandwidth as that allocated by the first base station 200 to another mobile station (not shown), and stands by for receiving the CDMA code from the corresponding mobile station 100 (S46).

As shown FIG. 1, the mobile station 100 having received the ranging response message (RNG-RSP) from the first base station 200 transmits the CDMA code to the first base station 200 and the second base station 300 at the transmission opportunity offset time of the first frame after the rendezvous time has passed, starting from the frame at which the ranging response message (RNG-RSP) is received (S48).

The CDMA code is received by the first base station 200 and the second base station 300 with a time difference therebetween. When the ranging response message (RNG-RSP) received by the mobile station 100 includes a power level adjustment value in the TLV format, the mobile station 100 changes and transmits the CDMA code intensity according to the power level adjustment value.

The first base station 200 and the second base station 300 respectively receive the CDMA code from the mobile station 100 and measure the timing adjustment values t1 and t2 of the CDMA code arrival time by using the CDMA code (S50 and S52), and the second base station 300 transmits the measured timing adjustment value t2 of the CDMA code arrival time to the first base station 200 (S54).

The first base station 200 uses the timing adjustment values t1 and t2 to calculate an uplink arrival time difference between the corresponding mobile station and the base station and measure the position of the mobile station 100 (S56).

As shown in FIG. 1, the first base station 200 operates T=(t1−t2) from the timing adjustment values t1 and t2 by using the U-TDOA measurement method, and calculates the distance difference between the base stations 200 and 300 and the mobile station 100 by using the product of T and light speed, thereby measuring the position of the corresponding mobile station 100. In this instance, the T value is not divided since the first base station 200 and the second base station 300 receive the CDMA code at the same frame.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The cost and efficiency are improved by measuring the position of the mobile station through changing the ranging method used in the conventional system.

The invention claimed is:

1. A method for measuring a position by a serving base station, the method comprising:
    allocating a first ranging code and a first ranging region for a mobile station;
    receiving a second ranging code and allocation information on a second ranging region of the mobile station from a neighboring base station;
    transmitting first ranging information including the first ranging code to the mobile station;
    transmitting an uplink MAP (UL-MAP) including allocation information of a first ranging region and a dedicated ranging indicator to the mobile station;
    receiving the first ranging code from the mobile station in the first ranging region when the mobile station checks whether the dedicated ranging indicator is enabled and then determines that the dedicated ranging indicator is enabled;
    calculating a received timing adjustment value of the first ranging code;
    transmitting second ranging information including the second ranging code to the mobile station;
    receiving a received timing adjustment value of the second ranging code from the neighboring base station; and
    measuring the position of the mobile station according to the received timing adjustment value of the first ranging code and the received timing adjustment value of the second ranging code without using a timing advance value,
    wherein
    the step of receiving the second ranging code and the allocation information on the second ranging region includes:
        transmitting a dedicated ranging allocation request on the mobile station to the neighboring base station to allocate a dedicated ranging region not usable by other mobile stations; and
        receiving a response signal including the second ranging code on the mobile station.

2. The method of claim 1, wherein
the step of transmitting the ranging information including the first ranging code and the second ranging code to the mobile station includes:
    transmitting a first ranging signal including the first ranging code, a first rendezvous time, and a first transmission opportunity offset; and
    transmitting a second ranging signal including the second ranging code, a second rendezvous time, and a second transmission opportunity offset after operating the received timing adjustment value of the first ranging code.

3. The method of claim 2, wherein the method includes:
    receiving the first ranging code at the first transmission opportunity offset of the first frame after the first rendezvous time after having transmitted the first ranging signal; and
    receiving the second ranging code at the second transmission opportunity offset of the first frame after the second rendezvous time after having transmitted the second ranging signal.

4. The method of claim 3, wherein the method includes correcting the second rendezvous time by using the time that is generated by subtracting a time for transmitting the second ranging signal from a time for receiving the second rendezvous time that is received from the neighboring base station, and then transmitting the corrected second rendezvous time.

5. A method for measuring a position by a serving base station, the method comprising:
    negotiating a dedicated ranging code and a dedicated ranging region for a neighboring base station and a mobile station;
    transmitting a ranging signal including the dedicated ranging code to the mobile station;
    transmitting an uplink MAP (UL-MAP) including allocation information of the dedicated ranging region and a dedicated ranging indicator to the mobile station;
    receiving the dedicated ranging code from the mobile station in the dedicated ranging region when the mobile station checks whether the dedicated ranging indicator is enabled and then determines that the dedicated ranging indicator is enabled;
    operating a received timing adjustment value of the dedicated ranging code;
    receiving a received timing adjustment value of the dedicated ranging code from the neighboring base station; and
    measuring a position of the mobile station according to a received timing adjustment value of the dedicated ranging code.

6. The method of claim 5, wherein
the ranging signal includes the dedicated ranging code, rendezvous time, and transmission opportunity offset.

7. The method of claim 6, wherein
the ranging signal further includes a power level adjustment value.

8. A method for measuring a position by a serving base station, the method comprising:

allocating a first ranging code and a first ranging region for a mobile station to allocate a dedicated ranging region not usable by other mobile stations;

transmitting the first ranging code and information on the first ranging region to the mobile station;

transmitting an uplink MAP (UL-MAP) including allocation information of a first ranging region and a dedicated ranging indicator to the mobile station;

receiving the first ranging code from the mobile station in the first ranging region when the mobile station checks whether the dedicated ranging indicator is enabled and then determines that the dedicated ranging indicator is enabled;

calculating a received timing adjustment value of the first ranging code requesting second ranging code and the second ranging region allocation for the mobile station from a neighboring base station;

receiving a second ranging code and information on a second ranging region for the mobile station from the neighboring base station;

transmitting ranging information including the second ranging to the mobile station;

receiving a received timing adjustment value for receiving the second ranging code from the mobile station from the neighboring base station; and measuring a position of the mobile station according to a received timing adjustment value of the first ranging code and a received timing adjustment value of the second ranging code without using a timing advance value.

9. The method of claim 8, wherein the information on the first ranging region includes a first rendezvous time and a first transmission opportunity offset, and the information on the second ranging region includes a second rendezvous time and a second transmission opportunity offset.

10. The method of claim 9, wherein time information that is generated by subtracting a time for transmitting the second ranging code to the mobile station from the second rendezvous time that is received from the neighboring base station is transmitted as the second rendezvous time.

* * * * *